Dec. 30, 1924.                                              1,521,426
                        R. W. BUETTNER
              CROSSHEAD FOR RECIPROCATING MACHINERY
                    Filed Aug. 11, 1924      2 Sheets-Sheet 1
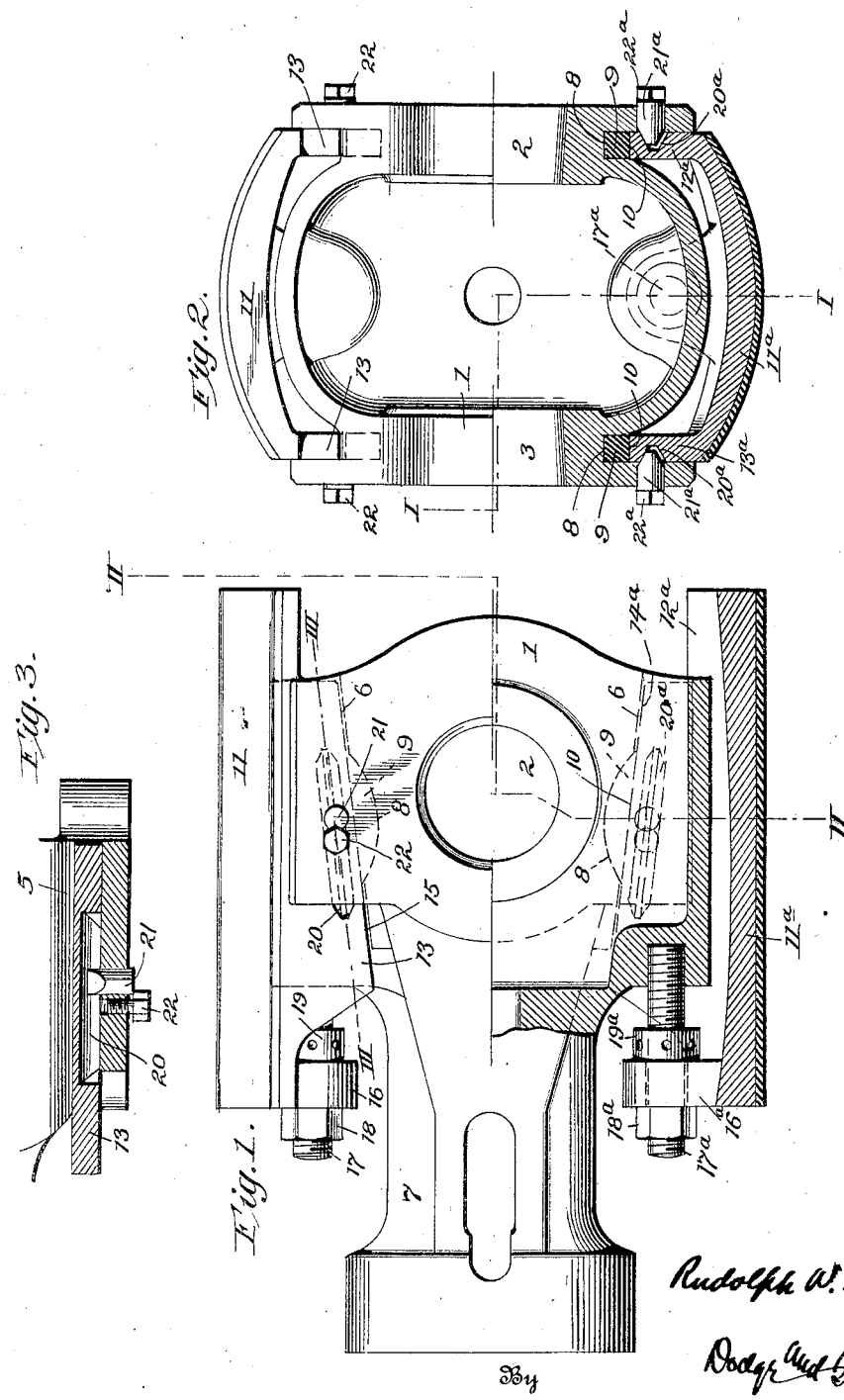

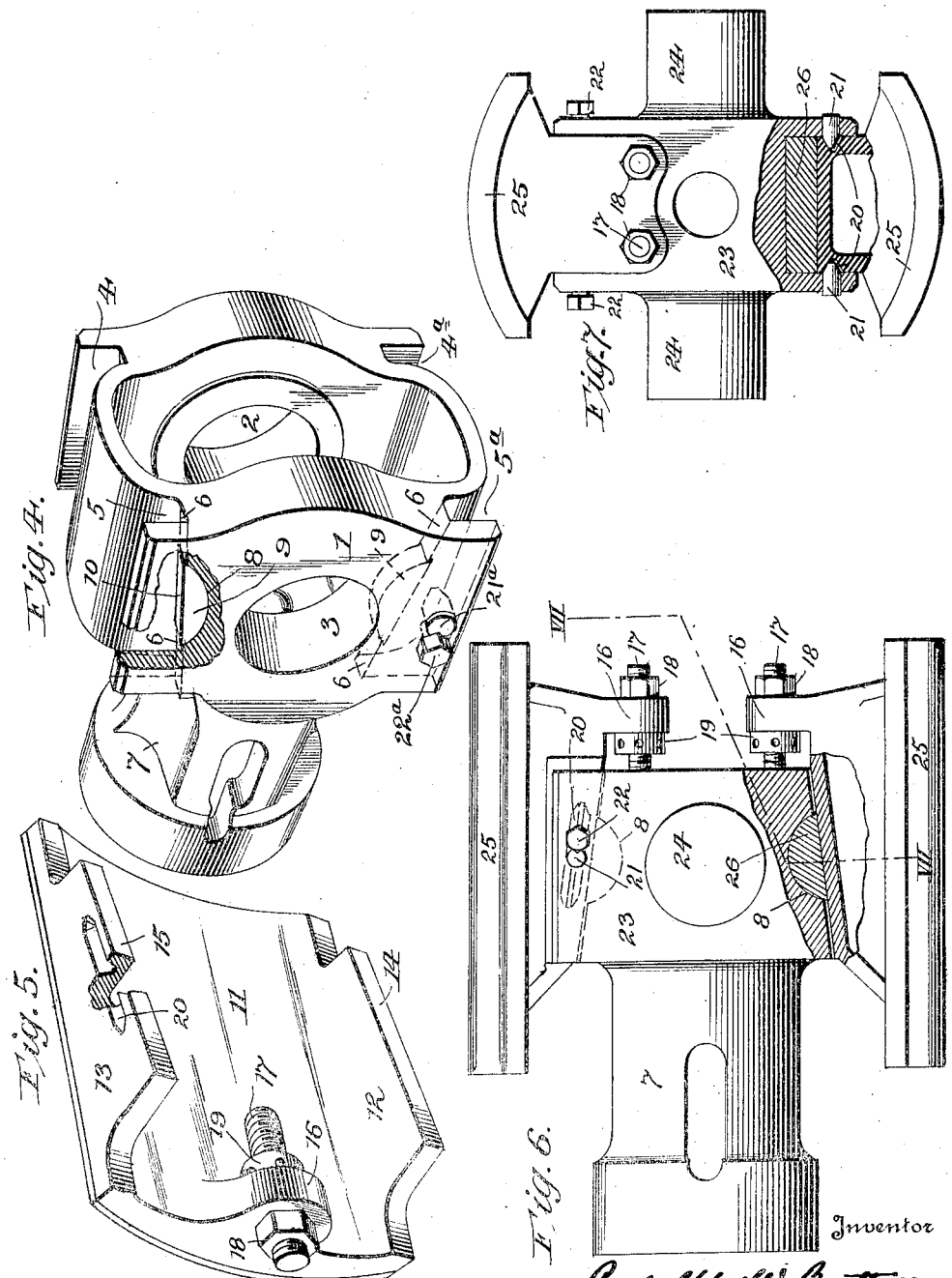

Patented Dec. 30, 1924.

1,521,426

UNITED STATES PATENT OFFICE.

RUDOLPH W. BUETTNER, OF MILWAUKEE, WISCONSIN, ASSIGNOR TO NORDBERG MANUFACTURING COMPANY, OF MILWAUKEE, WISCONSIN, A CORPORATION OF WISCONSIN.

CROSSHEAD FOR RECIPROCATING MACHINERY.

Application filed August 11, 1924. Serial No. 731,530.

*To all whom it may concern:*

Be it known that I, RUDOLPH W. BUETTNER, a citizen of the United States, residing at Milwaukee, in the county of Milwaukee and State of Wisconsin, have invented certain new and useful Improvements in Crossheads for Reciprocating Machinery, of which the following is a specification.

This invention pertains to cross heads for reciprocating engines and has for its main object the provision of a structure wherein the wear on the shoes or the guide may be readily taken care of, and likewise to provide means whereby the parts will automatically center or align themselves to maintain a true bearing of the cross head shoes upon the guides under all adjustments and working conditions.

A further object of the invention is to produce a structure wherein the side thrust on the cross head is transmitted directly from the cross head pin to the shoe, the arrangement being such that with a given size of cross head pin I am enabled to make the diameter of the cross head much smaller than is possible with any other construction of which I am aware, wherein an automatic centering or aligning device is employed. Such reduction of diameter of the cross head also reduces the necessary diameter of the guide pieces and as a consequence results in a reduction in the weight of the engine without loss of strength.

Two embodiments of the invention are illustrated in the annexed drawings, wherein,—

Fig. 1 is a side view of a head in sectional elevation, the section being taken on the line I—I of Fig. 2;

Fig. 2 a rear view of the head partly in section, the section being on the line II—II of Fig. 1;

Fig. 3 a detail transverse section on the line III—III of Fig. 1;

Fig. 4 a perspective view of the head with the shoes omitted;

Fig. 5 a similar view of one of the shoes;

Fig. 6 a side elevation partly in section of a modified form, and

Fig. 7 an end view with the lower portion in section on the line VII—VII of Fig. 6.

Referring first to Figs. 1 to 5, 1 denotes the body of the cross head having in its side walls the usual openings 2 and 3 for the reception of the cross head pin (not shown). The upper and lower faces of the head are each provided with two longitudinally disposed channels, 4 and 5 denoting the upper pair, and 4ª and 5ª the lower ones. As will be seen, said channels are in alinement with the side walls, in fact may be said to be formed in the outer faces or edges thereof. The bottom face of each groove denoted by 6 is flat and inclined, the opposite faces of said grooves as 4 and 4ª, and 5 and 5ª, converging toward the tail piece 7 of the head.

Formed in each of said inclined faces is a curved recess or seat 8 and seated in each recess is a rocking bearing block 9, the depth thereof being slightly in excess of the depth of the recess so that its upper flat face 10 stands somewhat above the inclined face 6. The radius upon which the curved surface of the seat 8 is formed is sufficiently large to produce a relatively long bearing face 10 upon the block fitting within the seat.

The shoes will be of the requisite contour to fit the guides (not shown) and in the present instance are illustrated as having curved outer bearing faces. The shoes being alike in form, a description of one applies to both, and similar parts are indicated by the same numerals with the exponent "a" added to those of, say, the lower shoe.

As will be best seen upon reference to Fig. 5, the shoe is formed as a single casting comprising a body 11 having two inwardly extending flanges 12 and 13 of such width and so spaced as to fit within the opposite grooves 4 and 5 or 4ª and 5ª. The lower flat faces 14 and 15, respectively, of the flanges are inclined, the inclination being the reverse of that of the faces 6, and, as will be seen, they bear directly upon the tiltable or rocking bearing blocks 9 when the parts are assembled.

To effect longitudinal movement and consequent inward or outward adjustment of the shoes with reference to the head, each shoe is provided with an inwardly extending lug 16 through which freely extends a threaded stem 17—said stem being firmly screwed into the adjacent portion of the head. Nuts 18 and 19 bearing upon opposite faces of the lug afford means for securing and maintaining the adjustment. To assist in the fine adjustment of the shoes and to secure their proper functioning with the rocking bearing blocks, the following means is employed. In the outer face of each of the flanges 12 and 13 there is formed a groove 20 substantially V-shaped in cross section and lying parallel to the bearing face or edge 14 or 15 as the case may be. Mounted in the outer wall of head, or more specifically, in the wall adjacent each of the grooves 4, 4ª, 5 and 5ª, is a pin 21, the inner end whereof is beveled and passes into the groove. A machine screw 22, see more particularly Fig. 3, is mounted in the wall adjacent said pin, the head of screw overlying the outer end of the pin and holding the same in place. Turning the screws in forces the shoes firmly up against the rocking bearing blocks and maintains them there during longitudinal adjustment, as above set forth. The pins are of course free to turn, hence no cramping of the parts under adjustment inheres.

With the construction above set forth, it will be seen that the side thrust on the cross head will be transmitted directly from the cross head pin to the shoe through the rockable bearing blocks 9. In other words, the bearing blocks and their seats and the wedge portions or flanges of the shoes are located in the planes in which the forces acting on the cross head pin are taken up by the cross head.

I am aware that self adjusting rocking bearings are broadly considered old in this art, but under such arrangement the rocking bearing members were mounted upon through bolts. My improvement over this form is that, with the present form, I transmit the side thrust on the cross head directly from the cross pin to the shoe, whereas, with the other arrangement, such thrust is transmitted through the pivot bolts, imposing upon them a shearing strain. Moreover, such old arrangement restricts the space in which the box of the connecting rod must go—whereas under the present arrangement no such obstruction inheres. As a consequence, with a given size of cross head pin I can make the diameter of the cross head much smaller than would be possible under the old arrangement. The reduction in diameter of the cross head also allows reduction in diameter of the guide piece with a consequent reduction in the weight of the engine without sacrifice of strength.

In Figs. 6 and 7 the invention is illustrated in the form wherein the cross head is designed to fit a forked connecting rod and wherein the head 23 is shown as provided with an integral pin 24. The cross head proper in this case becomes a central block which carries the shoes 25, a rockable bearing block 26 of the same form and arrangement as that above described being imposed between each of the shoes and the cross head.

This arrangement has the same advantages as the other above described in that the lateral force imposed upon the cross head pin is transmitted directly to the shoes.

What I claim is:

1. In a cross head for reciprocating machines, the combination of a cross head body; a pair of shoes carried thereby; and a rocking bearing block located between each shoe and the adjacent face of the cross head, said blocks having a direct bearing upon the head and shoes.

2. In a cross head for reciprocating machines, the combination of a cross head body; a pair of shoes carried thereby, said shoes each having at least one bearing face lying at an angle to the longitudinal axis of the shaft; a rocking bearing block located directly between the inclined face of each of the shoes and the body; and means for securing endwise adjustment of the shoes.

3. In a cross head for reciprocating machines, the combination of a cross head body having a channel extending longitudinally thereof, the base of the channel lying at an angle to the longitudinal axis of the body and having a rounded seat formed therein; a bearing block directly seated therein and having a straight outer bearing face; and a shoe having a flat face taking against the outer face of the block, said face lying in substantial parallelism with the base of the channel aforesaid.

4. In a cross head for reciprocating machines, the combination of a cross head body having a channel extending longitudinally thereof, the base of the channel lying at an angle to the longitudinal axis of the body and having a rounded seat formed therein; a bearing block directly seated therein and having a straight outer bearing face; a shoe having a flat face taking against the outer face of the block, said face lying in substantial parallelism with the base of the channel aforesaid; and means for effecting longitudinal adjustment of the shoe and securement thereof in its adjusted position.

5. In a cross head for reciprocating machines, the combination of a cross head body having a pair of oppositely disposed channels formed on the upper and lower faces thereof, the bottom wall of the grooves of the upper and lower channels converging toward each other with a rounded seat formed in the bottom wall of each channel; a rocking bearing block placed in each seat, the upper face whereof is flat and a pair of shoes, each shoe having a pair of inwardly projecting flanges the outer edges whereof are flat and inclined, said edges, when the parts are assembled, directly contacting the flat faces of the underlying bearing block.

6. In a cross head for reciprocating machines, the combination of a cross head body having a pair of oppositely disposed channels formed on the upper and lower faces thereof, the bottom wall of the grooves of the upper and lower channels converging toward each other with a rounded seat formed in the bottom wall of each channel; a rocking bearing block placed in each seat, the upper face whereof is flat; a pair of shoes, each shoe having a pair of inwardly projecting flanges the outer edges whereof are flat and inclined, said edges, when the parts are assembled, directly contacting the flat faces of the underlying bearing block; and means for securing longitudinal adjustment of the shoe with reference to the cross head body.

7. In a cross head for reciprocating machines, the combination of a cross head body; a pair of shoes carried thereby; a rocking bearing block located between each shoe and the adjacent face of the cross head, said blocks having a direct bearing upon the head and shoes; and means mounted in the sides of the body engaging the shoes and holding them in proper relation to the bearing blocks.

8. In a cross head for reciprocating machines, the combination of a cross head body; a pair of shoes carried thereby, said shoes having a V-shaped groove formed in each side face thereof; a rocking bearing block located directly between each shoe and the adjacent face of the cross head; a pin mounted in the body opposite each V-shaped groove, the inner end of the pin being tapered and passing into the adjacent groove; and means for holding the pins in their adjusted position.

9. In a cross head for reciprocating machines, the combination of a cross head body; a pair of shoes carried thereby, said shoes having a V-shaped groove formed in each side face thereof; a rocking bearing block located directly between each shoe and the adjacent face of the cross head; a pin mounted in the body opposite each V-shaped groove, the inner end of the pin being tapered and passing into the adjacent groove; means for holding the pins in their adjusted position; and means for securing longitudinal adjustment of the shoes.

In testimony whereof I have signed my name to this specification.

RUDOLPH W. BUETTNER.